US 9,189,845 B2

(12) United States Patent
Sochi (10) Patent No.: US 9,189,845 B2
(45) Date of Patent: Nov. 17, 2015

(54) APPARATUS, SYSTEM, AND METHOD OF INSPECTING IMAGE, AND RECORDING MEDIUM STORING IMAGE INSPECTION CONTROL PROGRAM

(71) Applicant: Yoshinori Sochi, Nerima-ku (JP)

(72) Inventor: Yoshinori Sochi, Nerima-ku (JP)

(73) Assignee: RICOH COMPANY, LTD., Tokyo (JP)

( * ) Notice: Subject to any disclaimer, the term of this patent is extended or adjusted under 35 U.S.C. 154(b) by 20 days.

(21) Appl. No.: 14/213,699

(22) Filed: Mar. 14, 2014

(65) Prior Publication Data

US 2014/0270397 A1 Sep. 18, 2014

(30) Foreign Application Priority Data

Mar. 15, 2013 (JP) ................. 2013-053956
Dec. 19, 2013 (JP) ................. 2013-262444

(51) Int. Cl.
*G06K 9/00* (2006.01)
*G06T 7/00* (2006.01)

(52) U.S. Cl.
CPC ....... *G06T 7/001* (2013.01); *G06T 2207/20081* (2013.01); *G06T 2207/20092* (2013.01); *G06T 2207/30144* (2013.01)

(58) Field of Classification Search
CPC .............. G06T 2207/30144; G06T 7/001; G06T 7/0008; G06T 7/0006; G06T 7/0004
See application file for complete search history.

(56) References Cited

U.S. PATENT DOCUMENTS

| | | | |
|---|---|---|---|
| 8,531,744 B2* | 9/2013 | Adachi | 358/504 |
| 8,654,398 B2* | 2/2014 | Dewancker et al. | 358/1.9 |
| 2002/0051565 A1* | 5/2002 | Hiroi et al. | 382/149 |
| 2002/0114506 A1* | 8/2002 | Hiroi et al. | 382/149 |
| 2005/0238205 A1* | 10/2005 | Kimura et al. | 382/112 |
| 2006/0115127 A1* | 6/2006 | Hatayama | 382/112 |
| 2006/0238780 A1* | 10/2006 | Dennison | 358/1.9 |
| 2008/0292176 A1* | 11/2008 | Sakai et al. | 382/144 |
| 2009/0202135 A1* | 8/2009 | Shimodaira | 382/141 |
| 2011/0182496 A1* | 7/2011 | Sakai et al. | 382/145 |
| 2013/0250319 A1* | 9/2013 | Kaneko et al. | 358/1.9 |
| 2013/0250369 A1* | 9/2013 | Kitai et al. | 358/405 |
| 2014/0002842 A1* | 1/2014 | Ito | 358/1.13 |
| 2014/0093139 A1* | 4/2014 | Yamagishi | 382/112 |
| 2014/0146370 A1* | 5/2014 | Banner et al. | 358/406 |
| 2014/0168709 A1* | 6/2014 | Tokumaru | 358/1.18 |
| 2014/0226177 A1* | 8/2014 | Shijoh | 358/1.14 |
| 2014/0270397 A1* | 9/2014 | Sochi | 382/112 |
| 2014/0314281 A1* | 10/2014 | Kojima et al. | 382/112 |

FOREIGN PATENT DOCUMENTS

| JP | 2005-217931 | 8/2005 |
|---|---|---|
| JP | 2011-122985 | 6/2011 |

* cited by examiner

*Primary Examiner* — Avinash Yentrapati
(74) *Attorney, Agent, or Firm* — Oblon, McClelland, Maier & Neustadt, L.L.P.

(57) ABSTRACT

An image inspection apparatus for inspecting an image output on a recording medium by scanning the recording medium as a scanned image. The inspection apparatus having a display controller that controls display of a normal read image, which includes only permissible defects for each type of defect, in the normal image display area, and that controls display of an abnormal read image, which includes at least one impermissible defect for each type of defect, in the abnormal image area. The inspection apparatus also includes a defect permissible changing unit that receives a moving operation instruction, which moves the displayed image between the normal image display area and the abnormal image display area and that, in response to receiving the moving operation instruction, changes the permissible defect level of at least one type of defect.

7 Claims, 10 Drawing Sheets

SCANNED IMAGE          MASTER IMAGE

| FAINT PRINT | TONER LEAK | DIRTY MARK | CURLED SELVAGE | ABNORMALITY IMAGE | BLACK LINE | WHITE LINE | ATTACHMENT OF THE DUST |
|---|---|---|---|---|---|---|---|
| 5 | 5 | 5 | 6 | 5 | 5 | 5 | 5 |

FIG. 9

| THE NUMBER OF PAGES | DEFECT LEVEL | | | | | | | | RESULT OF THE DEFECT DETERMINATION | PAGE DEFECT LEVEL | IMAGE STORED ADDRESS | IMAGE SIZE |
|---|---|---|---|---|---|---|---|---|---|---|---|---|
| | FAINT PRINT | TONER LEAK | DIRTY MARK | CURLED SELVAGE | ABNORMALITY IMAGE | BLACK LINE | WHITE LINE | ATTACHMENT OF THE DUST | | | | |
| 1 | 1 | 2 | 3 | 2 | 2 | 4 | 1 | 1 | NORMAL | 16 | aaaaaaaa | AAAA |
| 2 | 2 | 2 | 6 | 8 | 2 | 1 | 1 | 4 | ABNORMAL | 26 | bbbbbbbb | BBBB |
| 3 | 5 | 5 | 1 | 7 | 5 | 3 | 1 | 1 | ABNORMAL | 28 | cccccccc | CCCC |
| 4 | 6 | 3 | 1 | 1 | 3 | 8 | 4 | 1 | ABNORMAL | 27 | dddddddd | DDDD |
| 5 | 1 | 1 | 2 | 3 | 1 | 1 | 1 | 1 | NORMAL | 11 | eeeeeeee | EEEE |
| 6 | 2 | 3 | 1 | 3 | 3 | 1 | 2 | 3 | NORMAL | 18 | ffffffff | FFFF |
| 7 | 7 | 8 | 1 | 10 | 10 | 2 | 2 | 10 | ABNORMAL | 50 | gggggggg | GGGG |
| 8 | 4 | 1 | 1 | 2 | 4 | 4 | 5 | 1 | ABNORMAL | 22 | hhhhhhhh | HHHH |
| 9 | 1 | 4 | 1 | 1 | 1 | 4 | 2 | 1 | NORMAL | 15 | iiiiiiii | IIII |
| 10 | 2 | 2 | 1 | 1 | 1 | 1 | 1 | 1 | NORMAL | 10 | jjjjjjjj | JJJJ |

FIG. 10A

RESULT OF THE DEFECT DETERMINATION/NORMAL

PAGE 1
| | |
|---|---|
| FAINT PRINT: 1 | TONER LEAK: 2 |
| DIRTY MARK: 3 | CURLED SELVAGE: 2 |
| ABNORMALITY IMAGE: 2 | BLACK LINE: 4 |
| WHITE LINE: 1 | ATTACHMENT OF THE DUST: 1 |

PAGE 5
| | |
|---|---|
| FAINT PRINT: 1 | TONER LEAK: 1 |
| DIRTY MARK: 2 | CURLED SELVAGE: 3 |
| ABNORMALITY IMAGE: 1 | BLACK LINE: 1 |
| WHITE LINE: 1 | ATTACHMENT OF THE DUST: 1 |

PAGE 6
| | |
|---|---|
| FAINT PRINT: 2 | TONER LEAK: 3 |
| DIRTY MARK: 1 | CURLED SELVAGE: 3 |
| ABNORMALITY IMAGE: 3 | BLACK LINE: 1 |
| WHITE LINE: 2 | ATTACHMENT OF THE DUST: 3 |

PAGE 9
| | |
|---|---|
| FAINT PRINT: 1 | TONER LEAK: 4 |
| DIRTY MARK: 1 | CURLED SELVAGE: 1 |
| ABNORMALITY IMAGE: 1 | BLACK LINE: 4 |
| WHITE LINE: 2 | ATTACHMENT OF THE DUST: 1 |

FIG. 10B

RESULT OF THE DEFECT DETERMINATION/ABNORMAL

PAGE 2
FAINT PRINT: 2        TONER LEAK: 2
DIRTY MARK: 6         CURLED SELVAGE: 8
ABNORMALITY IMAGE: 2  BLACK LINE: 1
WHITE LINE: 1         ATTACHMENT OF THE DUST: 4

PAGE 3
FAINT PRINT: 5        TONER LEAK: 5
DIRTY MARK: 1         CURLED SELVAGE: 7
ABNORMALITY IMAGE: 5  BLACK LINE: 3
WHITE LINE: 1         ATTACHMENT OF THE DUST: 1

PAGE 4
FAINT PRINT: 6        TONER LEAK: 3
DIRTY MARK: 1         CURLED SELVAGE: 1
ABNORMALITY IMAGE: 3  BLACK LINE: 8
WHITE LINE: 4         ATTACHMENT OF THE DUST: 1

PAGE 8
FAINT PRINT: 4        TONER LEAK: 1
DIRTY MARK: 1         CURLED SELVAGE: 2
ABNORMALITY IMAGE: 4  BLACK LINE: 4
WHITE LINE: 5         ATTACHMENT OF THE DUST: 1

APPARATUS, SYSTEM, AND METHOD OF INSPECTING IMAGE, AND RECORDING MEDIUM STORING IMAGE INSPECTION CONTROL PROGRAM

CROSS-REFERENCE TO RELATED APPLICATIONS

This patent application is based on and claims priority pursuant to 35 U.S.C. §119 to Japanese Patent Application Nos. JP 2013-053956 and JP2013-262444, respectively filed on Mar. 15, 2013 and Dec. 19, 2013, in the Japan Patent Office, the entire disclosures of which are hereby incorporated by reference herein.

BACKGROUND

1. Field of the Invention

The present invention relates to an apparatus, system, and method of inspecting an image formed by an image forming apparatus, and a recording medium storing an image inspection control program.

2. Description of the Related Art

Conventionally, the inspection of printed matter has been performed by human operators. In recent years, inspection apparatuses that automatically inspect printed matter have been widely used, mainly in the field of offset printing. For example, in conventional devices a master image would be generated by reading specific printed matter that was selected based on the image quality, as a reference image. The corresponding portions of the master image and a subsequently read image of printed matter would be compared to determine, by the degree of difference therebetween, whether there was a defect in the printed matter.

Printing apparatuses, such as electrophotographic apparatuses, have been widely used to print a small number of pages. For example, a printing apparatus may perform variable printing in which the printed contents differ on each page. In such case, comparing the printed matter, with a master image generated from previously printed matter, would be inefficient. In view of this, the master image has typically been generated based on print data and then compared with the printed image to be inspected.

Japanese Patent Application Publication No. 2005-217931-A proposes a method of performing quality determination with a threshold higher in a specific area than in other areas outside the specific area.

In particular, this publication describes executing a defect determination of printed matter based on a defect level indicating the degree of the defect for each type of defect. The types of defect include faint printing, dirty marks, and excess lines. In this publication, an image inspection apparatus is used to determine whether there is a defect in the printed matter based on the degree of difference between corresponding portions of the master image and a read printed matter image. Further, the image inspection apparatus identifies the type of defect and the defect level from the printed matter image.

The image inspection apparatus then determines whether the identified defect level for each type of defect exceeds a permissible defect level for each type of defect. When the identified defect level for each type of defect exceeds the permissible defect level, the image inspection apparatus determines that the printed matter is abnormal. In the above noted system the user must manually set the permissible defect level for each type of defect. However, it is difficult for the user to intuitively set the permissible defect level for each type of defect. Furthermore, the technology disclosed by JP-2005-217931-A only performs a quality determination in a specific area and does not set the permissible defect level for each type of defect. As a result, the permissible defect level automatically set for the specific area is not always the level desired by the user.

In view of the above, the inventors of the present embodiments have discovered that there is a need for an apparatus, a system, a method, and a non-transitory recording medium storing an image inspection control program, each of which is capable of permitting the user to intuitively set the permissible defect level for each type of defect.

SUMMARY

In one aspect of the present invention, there is described an image inspection system for inspecting an image output on a recording medium by scanning the recording medium as a scanned image. The image inspection apparatus includes an inspection reference image generator implemented by processing circuitry and configured to obtain an output-target image print data, and to generate an inspection reference image using the output-target image print data, the inspection reference image providing a reference in inspection of a read image, an inspection result acquisition unit implemented by the processing circuitry and configured to acquire a result of a defect determination based on a difference between the generated inspection reference image and the read image, a defect type determiner unit implemented by the processing circuitry and configured to determine a type of any defect included the read image when the defect determination determines that at least one defect is present in the read image, a defect level calculating unit implemented by the processing circuitry and configured to calculate a defect level indicating a degree of the defect for each type of defect for a predetermined number of types of defect, a type classification determiner unit implemented by the processing circuitry and configured to determine, for each type of defect, whether each defect included in the read image is permissible based on a permissible defect level for each type of defect; a display controller implemented by the processing circuitry and configured to control display of a normal read image, which includes only permissible defects for each type of defect, in the normal image display area, and to control display of an abnormal read image, which includes at least one impermissible defect for each type of defect, in the abnormal image area, and a defect permissible changing unit implemented by the processing circuitry and configured to receive a moving operation instruction which moves the displayed image between the normal image display area and the abnormal image display area and configured to, in response to receiving the moving operation instruction, change the permissible defect level of at least one type of defect.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict exemplary embodiments and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) calculators or the like. These terms, in general, may be referred to as processors and/or circuitry.

Unless specifically stated otherwise, or as is apparent from the discussion, terms such as "processing" or "calculating" or "calculating" or "determining" or "displaying" or the like, refer to the action and processes of a calculator system, or similar electronic calculating device, that manipulates and transforms data represented as physical, electronic quantities within the calculator system's registers and memories into other data similarly represented as physical quantities within the calculator system memories or registers or other such information storage, transmission or display devices.

Figure 1:
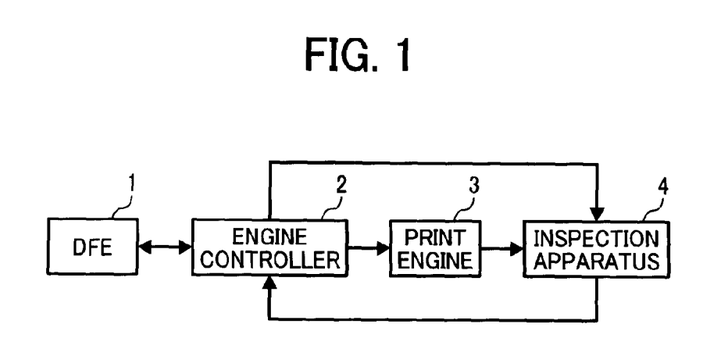
FIG. 1 shows a schematic configuration of an image forming system including an inspection apparatus according to an exemplary embodiment.

FIG. 1 shows an example configuration of an image forming system according to an exemplary embodiment. As shown in FIG. 1, the image forming system includes, for example, a digital front end (DFE) 1, an engine controller 2, a print engine 3 and an inspection apparatus 4. Based on a received print job, the DFE 1 generates bitmap data, which is image data to be output (i.e., output-target image), and outputs the generated bitmap data to the engine controller 2.

Based on the bitmap data received from the DFE 1, the engine controller 2 controls the print engine 3 to conduct an image forming operation. Further, the engine controller 2 transmits the bitmap data received from the DFE 1 to the inspection apparatus 4. The bitmap data is then used as original information for preparing an inspection reference image to be used for inspection, where the inspection at the inspection apparatus 4 includes inspecting an output result of an image forming operation of the print engine 3.

Under the control of the engine controller 2, the print engine 3 conducts an image forming operation on a recording medium, such as paper, using the bitmap data, scans an output paper, such as a paper printed with an image using a scanner, and inputs the read image data into the inspection apparatus 4. The recording medium may be, for example, a sheet, such as paper, film, or plastic sheet, or any material that can be used in outputting (i.e., forming) of an image by an image forming operation. Based on the bitmap data input from the engine controller 2, the inspection apparatus 4 generates a master image. The inspection apparatus 4 then compares the read image data, input from the print engine 3, with the generated master image to conduct an image inspection of the output image in which the inspection apparatus 4 is used as the image inspection apparatus.

When the inspection apparatus 4 determines that the read image, generated from the printed image, has a defect in the output result, the inspection apparatus 4 notifies the engine controller 2 that the page corresponding to the read image has a defect. Accordingly, reprinting of the page having the defect is carried out by the engine controller 2.

Figure 2:
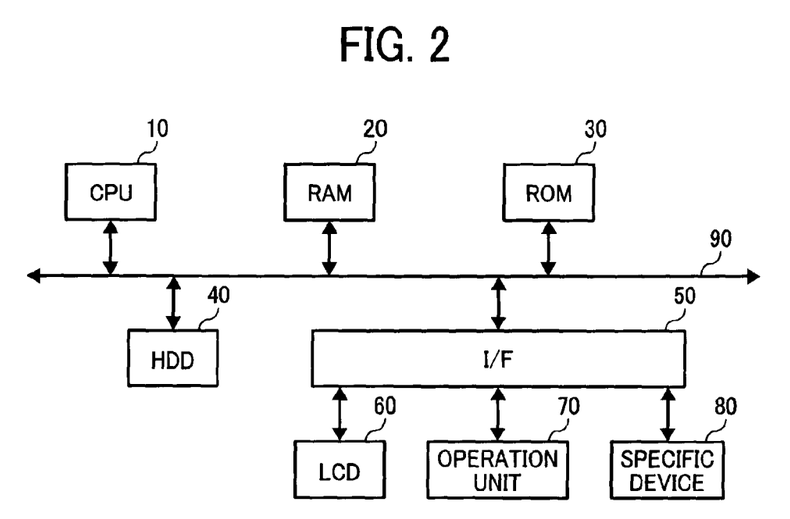
FIG. 2 shows an example block diagram of a hardware configuration of the inspection apparatus according to an exemplary embodiment.

A description follows of the hardware configuration of the engine controller 2, the print engine 3, and the inspection apparatus 4 according to an exemplary embodiment with reference to FIG. 2. Further, with respect to the inspection apparatus 4, scanner and printer engines may be incorporated into the hardware configuration shown in FIG. 2. FIG. 2 shows a block diagram of an exemplary hardware configuration of the inspection apparatus 4. The engine controller 2 and the print engine 3 may have a hardware configuration similar to the inspection apparatus 4 shown in FIG. 2.

As shown in FIG. 2, the inspection apparatus 4 may be configured similarly to information processing apparatuses such as general servers, personal computers (PC), or the like. Specifically, the inspection apparatus 4 includes a central processing unit (CPU) 10, a random access memory (RAM) 20, a read only memory (ROM) 30, a hard disk drive (HDD)

40, and an interface (I/F) 50, each connectable to each other via a bus 90. Further, the I/F 50 is connectable to a liquid crystal display (LCD) 60, an operation unit 70, and a specific device 80.

The CPU 10 is implemented by a processor or circuitry, such as a microprocessor, which is capable of controlling the entire operation of the inspection apparatus 4. The RAM 20 is implemented by a volatile memory that writes various data thereto or reads various data therefrom with relatively high speeds. The RAM 20 may be used as a work memory area of the CPU 10. The ROM 30 is implemented by a nonvolatile memory from which various data is read. The ROM 30 may store various programs such as firmware. The HDD 40 is implemented by a nonvolatile memory from which various data is read. The HDD 40 may store various control programs such as an operating system (OS) and application programs, such as the inspection control program.

The I/F 50 allows various hardware devices to be connected through the bus 90 or to the outside through a network, and controls these connections. The LCD 60 functions as a user interface, which allows a user to visually check the status of the inspection apparatus 4. The operation device 70 functions as a user interface, which allows the user to input various data to the inspection apparatus 4 using, for example, a keyboard or a mouse. The LCD 60 and the operation device 70 may be integrated into one device, for example, in the form of a touch panel screen.

The specific device 80 may be disposed as hardware, which is able to carry out a specific capability or function for each of the engine controller 2, the print engine 3 and the inspection apparatus 4. For example, as for the print engine 3, the specific device 80 may be a plotter, which is able to conduct an image forming operation on sheets, and/or a scanner, which is able to scan images output on the sheets. Further, as for the engine controller 2 and the inspection apparatus 4, the specific device 80 may be a specific calculating circuit to conduct high speed image processing, and/or the specific device 80 may be, for example, an application specific integrated circuit (ASIC).

In the above described hardware configuration, software programs stored in a storage area such as the ROM 30, the HDD 40, or an optical disk may be read and loaded into the RAM 20. The CPU 10 could run such programs to control various units, which could configure a software-executing controller. Configuration of a functional block to operate the engine controller 2, the print engine 3 and the inspection apparatus 4 may be carried out using a combination of such a software-executing controller and hardware. In an exemplary embodiment, at least one of the units is implemented as hardware or as a combination of hardware and software.

Figure 3:
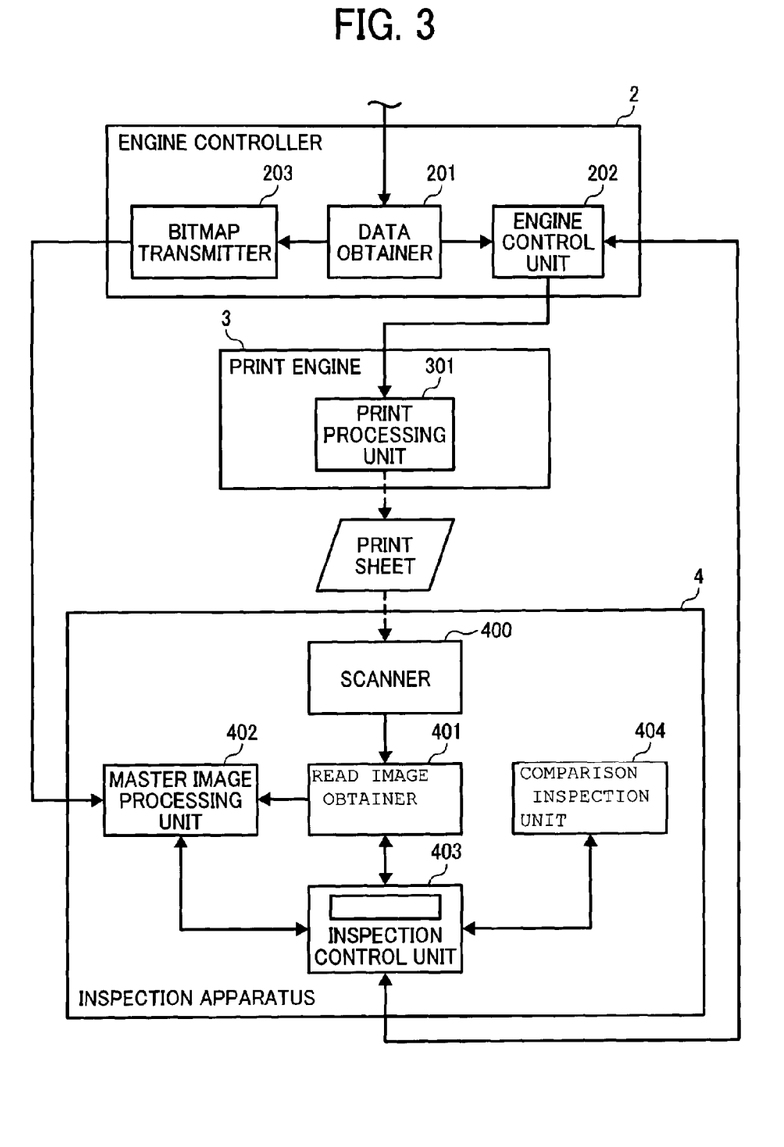
FIG. 3 shows an example block diagram of an engine controller, a print engine and an inspection apparatus according to an exemplary embodiment.

FIG. 3 shows an example block diagram of the engine controller 2, the print engine 3 and the inspection apparatus 4. In FIG. 3, the dashed lines show the data, and the broken lines show the flow of the recording sheets. As shown in FIG. 3, the engine controller 2 includes, for example, a data obtainer 201, an engine control unit 202, and a bitmap transmitter 203. Further, the print engine 3 includes, for example, a print processing unit 301 and the inspection apparatus 4 includes, for example, a read image obtainer 401, a master image processing unit 402, an inspection control unit 403, and a comparison inspection unit 404.

Upon obtaining the bitmap data from the DFE 1 by way of the data obtainer 201, the engine control unit 202 and the bitmap transmitter 203 execute their respective operations. The bitmap data is pixel information composing an image that is to be output by an image forming operation. The data obtainer 201 can operate as a pixel information obtainer.

Based on the bitmap data transferred from the data obtainer 201, the engine control unit 202 instructs the print engine 3 to conduct an image forming operation, in which the engine control unit 202 can operate as an output execution control unit. The bitmap transmitter 203 transmits the bitmap data, obtained by the data obtainer 201, to the inspection apparatus 4.

The print processing unit 301 obtains the bitmap data input from the engine controller 2, conducts an image forming operation, which transfers the image onto a sheet, and outputs a corresponding printed sheet. Therefore, the print processing unit 301 can implement imaging forming within an image forming apparatus. The print processing unit 301 is able to use any type of image forming mechanism including, for example, electrophotography, the inkjet method, or the like.

The scanner 400 scans an image formed on the sheet by conducting a printing operation by the print processing unit 301, and outputs read data. The scanner 400 is, for example, a line scanner disposed along a transport route of the sheet output by the print processing unit 301. The scanner 400 scans the transported sheet face thereby reading an image formed on the sheet.

The read image, which is read by the scanner 400, is an inspection target, which is inspected by the inspection apparatus 4. Because the read image is obtained from the sheet face on which is formed the output image, the read image becomes the image indicating the output result.

The read image obtainer 401 obtains the read image data generated by the scanner 400 scanning the sheet face. The read image obtainer 401 outputs the read image data, as an inspection target image, to the comparison inspection unit 404. In addition, the read image data is output to the comparison inspection unit 404 via the inspection control unit 403. Specifically, the inspection control unit 403 acquires the read image data and then outputs the read image data to the comparison inspection unit 404.

As described above, the master image processing unit 402 obtains the bitmap data input from the engine controller 2, and generates a master image for use as an inspection reference image for comparison with the inspection target image. Therefore, based on the output-target image, the master image processing unit 402 operates as an inspection reference image generator that generates the master image acting as the inspection reference image for use in inspecting the read images.

The inspection control unit 403 controls the inspection apparatus 4 as a whole, and each unit in the inspection apparatus 4 is operated under the control of the inspection control unit 403.

The comparison inspection unit 404 is used as an image inspection unit that compares the read image data, input from the read image obtainer 401, and the master image, generated by the master image processing unit 402, to determine whether the desired image forming operation has been conducted. The comparison inspection unit 404 may be implemented by the above mentioned ASIC or the like to process a large amount of data with high speed.

The comparison inspection unit 404 compares the read image data and the master image expressed via 8-bits for each one of R, G and B (total 24 bits) for each corresponding pixel. In particular, for each pixel, the comparison inspection unit 404 calculates pixel value differences for each one of R, G, and B. Based on a comparison of the calculated differences and a threshold, the comparison inspection unit 404 determines whether a defect has occurred in the read image data.

Figure 4:
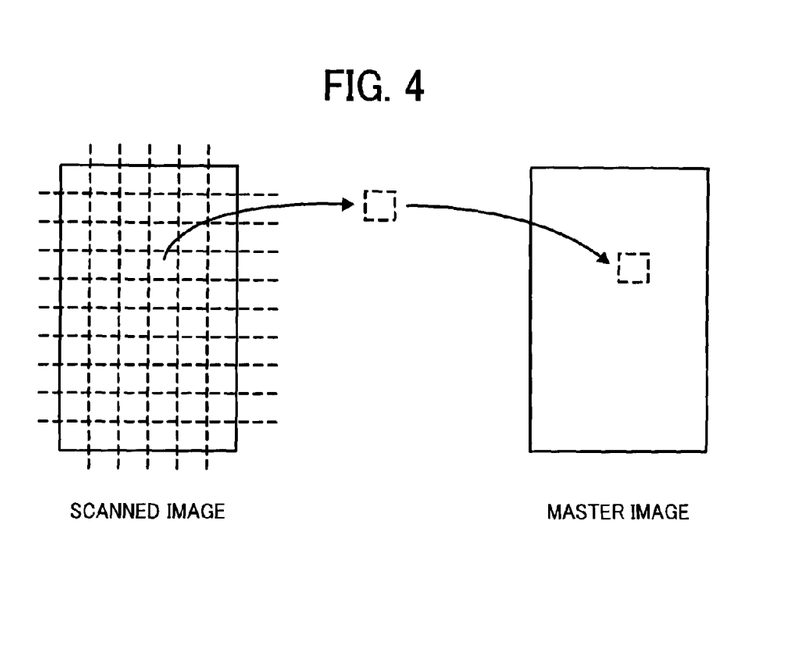
FIG. 4 shows a process of comparing images for inspection according to an example embodiment.

When comparing the read image with the master image, the comparison inspection unit 404 superimposes a segmented portion of the read image onto an apparently corresponding segment of the master image as is illustrated in FIG. 4 in order to calculate any difference in pixel values, that is, any difference in intensity values between the pixels. In order to confirm the correspondence, the comparison inspection unit 404 shifts the segment of the read image in the vertical and horizontal directions to determine the position where the calculated difference value is the smallest. This position is determined as the correct superimposed position and the corresponding calculated difference value is set as the comparison result. By the above processing, a position of the master image is matched to a correct position of the reading image in order to ensure a correct calculation of the difference value.

In addition, computational complexity can be reduced by not superimposing the whole of the master image onto the read image. Furthermore, even if there is a difference between the whole read image and the whole master image, it is possible to reduce the influence of the difference by aligning and dividing the image for each range, as is shown in FIG. 4.

Further, the inspection control unit 403 is able to compare the difference value and the threshold as follows. For example, the difference values calculated for each of the pixels may be summed for a given area of an image to a total value. The total value is then compared with the set threshold. The given area for summing the difference values for each of the pixels is, for example, a 20-dot square area. In an exemplary embodiment, the set threshold is a value corresponding to the total difference value for the given area (hereinafter, the defect area) obtainable by summing values of the differences. The comparison inspection unit 404 is able to output position information for the defect area of an image having a total difference value exceeding the threshold. This position information is useable as information indicating the presence of a defect in the read image data. The position information in the image is defined by, for example, the coordinate information of the image.

Moreover, in the said embodiment, the comparison inspection unit 404 computes and outputs the difference value of the pixel, which is included in the master image, and the pixel which is included in the reading image. In one example, a comparison between the difference value and the threshold value is performed by the inspection control unit 403. In addition, the comparison inspection unit 404 computes and outputs the difference value between the pixel, which is included in the master image, and the pixel, which is included in the read image. Further, a comparison between the difference value and the threshold value may be performed by the comparison inspection unit 404. In addition, the comparison inspection unit 404 may Output information of the comparison inspection to the inspection control unit 403.

Figure 5:
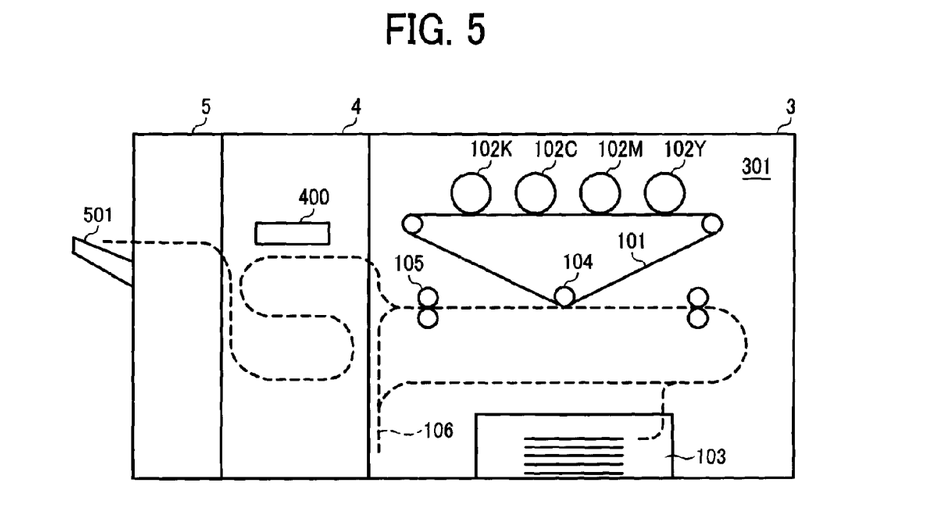
FIG. 5 shows a schematic mechanical configuration of a print processing unit according to an exemplary embodiment.

The image inspection system of FIG. 5 may be implemented by a system including a print engine 3, an inspection apparatus 4, and a stacker 5. The print engine 3 is implemented as the tandem-type image forming device. More specifically, the print engine 3 includes a plurality of photoconductive drums 102Y, 102M, 102C, and 102K (collectively referred to as the photoconductive drum 102), which are disposed side by side along a transfer belt 101 in the direction upstream of the sheet transfer direction. The transfer belt 101, which is an endless belt, is an intermediate transfer belt, which is formed with an intermediate transfer image to be transferred onto the recording sheet fed by a sheet feeding tray 103. In operation, the toner images of the respective colors, which are formed on the surfaces of the photoconductive drums 102, are transferred to the transfer belt 101 one above the other in order to form the full-color toner image.

The full-color toner image formed on the transfer belt 101 is conveyed to a transfer position between a transfer roller 104 and a sheet transfer path (indicated by the dotted line). At the transfer position, the full-color toner image is transferred from the transfer belt 101 onto the recording sheet, which is transferred along the sheet transfer path by a plurality of transferring rollers 104.

The recording sheet, having the full-color toner image formed thereon, is further conveyed to a fixing roller 105. The fixing roller 105, together with a pressure roller, fixes the toner image onto the recording sheet by heat and pressure. The recording sheet is then conveyed into the inspection apparatus 4. In case of printing double-sided images, the recording sheet having one side with the toner image fixed thereon, is conveyed into a switchback path 106, and transferred back into the transfer roller 104 so that another image can be formed on the other side of the recording sheet.

In the sheet conveyance route inside the inspection apparatus 4, the scanner 400 reads each sheet surface conveyed from the print processing part 301, and outputs the sheet to the read image obtainer 401, which forms a read image. The read image obtainer 401 is included inside the inspection apparatus 4. Moreover, the read sheet is further conveyed inside the inspection apparatus 4, is conveyed by the stacker 5, and is ejected by the scanner 400 at the paper delivery tray 501. In addition, in FIG. 5, there is illustrated an exemplary case in which the scan 400 is implemented with respect to only one side of a sheet in the conveyance route of the sheet in the inspection apparatus 4. However, since the inspection of both surfaces of the sheet is possible, the scanner 400 may also be positioned with respect to both surfaces of the sheet.

Figure 6:
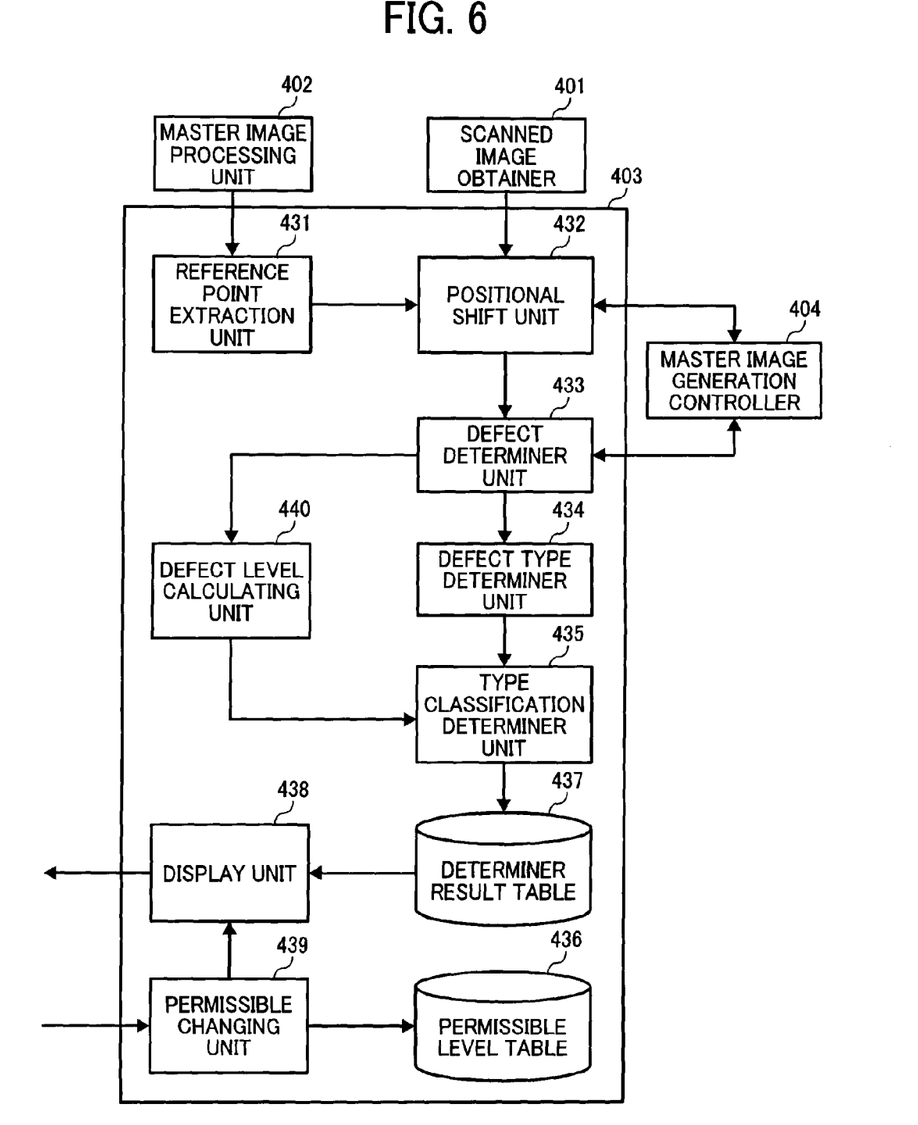
FIG. 6 shows an example block diagram of an inspection control unit according to an exemplary embodiment.

In the structure according to an exemplary embodiment, the user is able to intuitively set the permissible defect level for each type of defect. FIG. 6 shows an exemplary block diagram of the inspection control unit 403. As shown in FIG. 6, the inspection control unit 403 includes, for example, a reference point extraction unit 431, a positional shift unit 432, a defect determiner unit 433, a defect type determiner unit 434, a defect level calculating unit 440, a type classification determiner unit 435, a permissible level table 436, a determiner result table 437, a display unit 438, and a permissible changing unit 439.

Figure 13A:
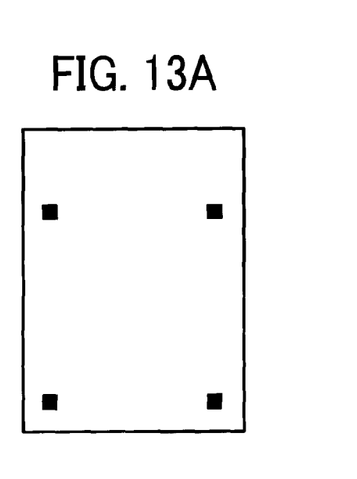
FIGS. 13A and 13B show an illustration explaining operation of corners extraction of the image according to an exemplary embodiment.
Figure 13B:
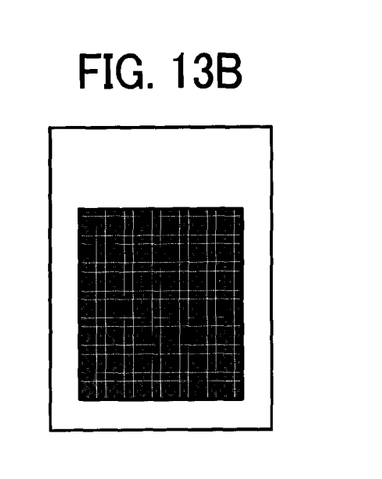

The reference point extraction unit 431 extracts reference points, which are used for matching positions in the images with the master image inputted from the master image processing unit 402. The reference points are the marks on the four corners indicating the targeted area of the document for image formation and are output as shown in FIG. 13A. If no marks, such as the marks illustrated in FIG. 13A, are provided, any pixel suitable for substitution for such marks may be extracted from the images by using a corner extraction filter or other suitable image filters. For example, the corner shown in FIG. 13A is extracted by applying the image filter, such as a corner extraction filter, to an image as shown in FIG. 13B.

The positional shift unit 432 aligns the images based on the reference points extracted by the reference point extraction unit 431 and the read image input by the read image obtainer 401 in order to calculate the positional deviation amount between the master image and the read image. As is described above with reference to FIG. 4, the positional shift unit 432 extracts the image within a predetermined range around a reference point extracted from the master image. Further, the positional shift unit 432 extracts the image at the position corresponding to the predetermined range in the master image, from the read image and inputs the extracted image at the position to the comparison inspection unit 404. Further, as described above with reference to FIG. 4, the positional shift unit 432 calculates the difference in pixel values between the master image and the read image.

The positional shift unit 432 shifts the image extracted from the read image left/right and up/down and repeatedly acquires a result of the difference calculation by the comparison inspection unit 404 in order to determine the read image extraction area at a position having the smallest difference with respect to the master image extraction area. The positional shift unit 432 determines the amount of positional deviation between the read image extraction area and the master image extraction area as the reference point positional deviation amount.

The positional shift unit 432 repeats the above processing for a number of reference points extracted from the master image in order to determine the definitive positional deviation amount based on the positional deviation amounts calculated for each reference point. The definitive positional deviation amount can be determined, for example, by adopting an average of the positional deviation amounts calculated for each reference point and by calculating each positional deviation amount by linear interpolation based on each reference point.

The defect determiner unit 433 inputs the master image and the read image input by the positional shift unit 432 into the to the comparison inspection unit 404 in order to determine whether the printed image is a defect image based on the positional deviation amount calculated by the comparison inspection unit 404 as shown in FIG. 4. The defect determiner unit 433 functions as an inspection result acquisition unit. When the result of the defect determination is that the printed image is a defect image, the difference between the master image and the read image, and the location of the read image at which the difference is calculated, which is used to determine the defect location.

In addition, the defect determiner unit 433 extracts the image in the inspection range from each of the master image and the read image and inputs the extracted images into the comparison inspection unit 404. The extraction of the images is performed considering the positional deviation amount calculated by the positional shift unit 432. That is to say, the defect determiner unit 433 extracts the part from the read image corresponding to the part in the master image divided as shown in FIG. 4 taking into consideration the positional deviation amount calculated by the positional shift unit 432. This will enable, as described above with reference to FIG. 4, the comparison inspection unit 404 to inspect in the state of the matched pixel positions between the read image and the master image, in response to the comparison inspection unit 404 shifting the image, extracted from the read image, left/right and up/down. Thus, the comparison inspection unit 404 is able to calculate the shift with comparatively less amount of computation.

Figure 7A:
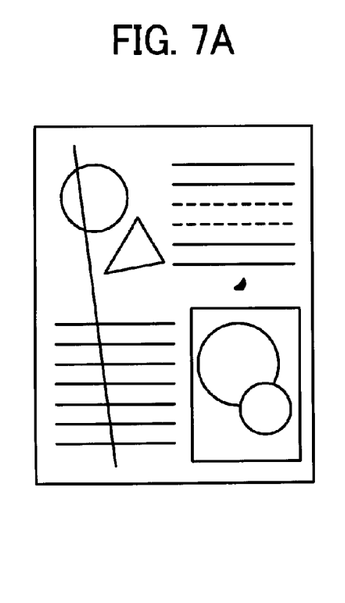
FIG. 7A shows examples of a printed matter determined the presence of defects according to an exemplary embodiment.
Figure 7B:
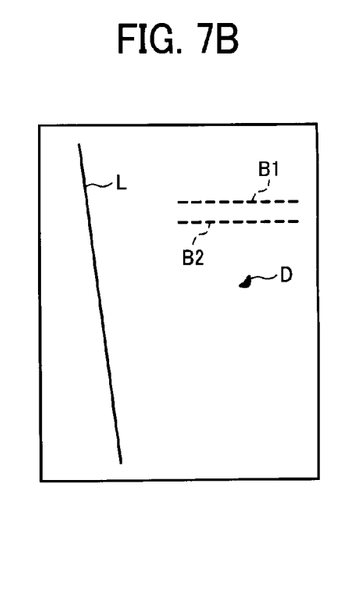
FIG. 7B shows examples of defects included in the printed matter as shown in FIG. 7A according to an exemplary embodiment.

FIG. 7A illustrates a printed matter in which the presence of defects has been detected by the defect determiner unit 433. FIG. 7B illustrates the defects found in the printed matter shown in FIG. 7A. The defect type determiner unit 434 further identifies the types of defects shown in FIG. 7B using the read image of the printed matter based on the result of the defect determination by the defect determiner unit 433.

The defect type determiner unit 434 processes labeling for an image of a page, which has been judged to include a defect in the defect determination. The labeling includes processing to allot the same label to a pixel when neighboring pixels have the same color or the same defect areas continuing within the scanned image (e.g. there is a connection ingredient between pixels). The defect type determiner unit 434 determines the type of defect from a feature quantity of the defect, such as the area or the length of a connection ingredient labeled as existing at the defect position resulting from the defect determination. For example, the feature quantities may be determined beforehand for each type of the defect. In this example, the defect type determiner unit 434 could determine the type of defect having a feature quantity that is the closest to the feature quantity, such as square measurement and/or length, of the connection ingredient labeled as existing at the location of the defect resulting from the defect determination. For example, the defect type determiner unit 434 could determine a black line L, a faint print B1, a faint print B2 and dirty mark D among the defects shown in FIG. 7A.

In addition, the defect level calculating unit 440 calculates a defect level for each type of defect detected by the defect type determiner unit 434 based on the result of the defect determination. In other words, the defect level calculating unit 440 operates as a defect degree calculating unit. The defect level represents the degree of the defect. For example, in this embodiment, the defect level is divided from 1 to 10 at predefined intervals, where level 1 is the lowest degree and level 10 is highest degree.

Figure 8:
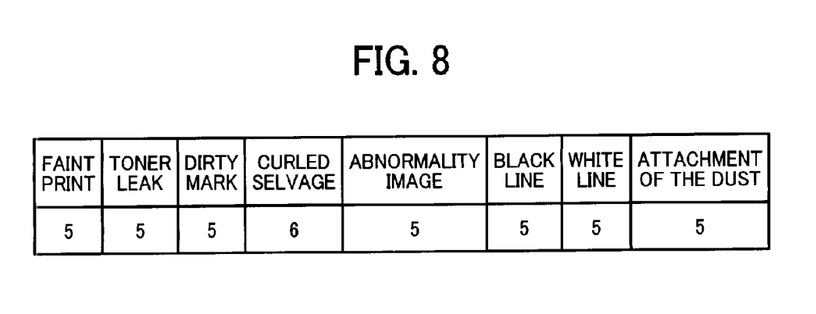
FIG. 8 shows a defect permissible table according to an exemplary embodiment.

The type classification determiner unit 435 determines, for each type of the defect, whether the defect is permissible based on the defect levels input from the defect type determiner unit 434 for each type of defect input from the defect type determiner unit 434. FIG. 8 illustrates a permissible level table stored in the permissible level table database 436. In the permissible level table database 436, a permissible defect level is defined for each of the types of defect. For example, the permissible defect level for a curled side may be defined as "6", and the permissible defect level for defects other than the curled side may be defined as "5".

The type classification determiner unit 435 obtains the permissible defect threshold corresponding to each type of defect from the permissible level table. The type classification determiner unit 435 is able to determine that the print result of the page is erroneous, that is, that there is a defect in the page, which the user cannot accept. In particular, the type classification determiner unit 435 determines whether there is a defect with a level that is higher than the permissible defect threshold for the respective type of defect. Further, the type classification determiner unit 435 may determine that that the print result of the page is erroneous, if there are at least a predetermined number of defects having a defect level that is higher than the permissible defect threshold for each type of defect.

Figure 9:
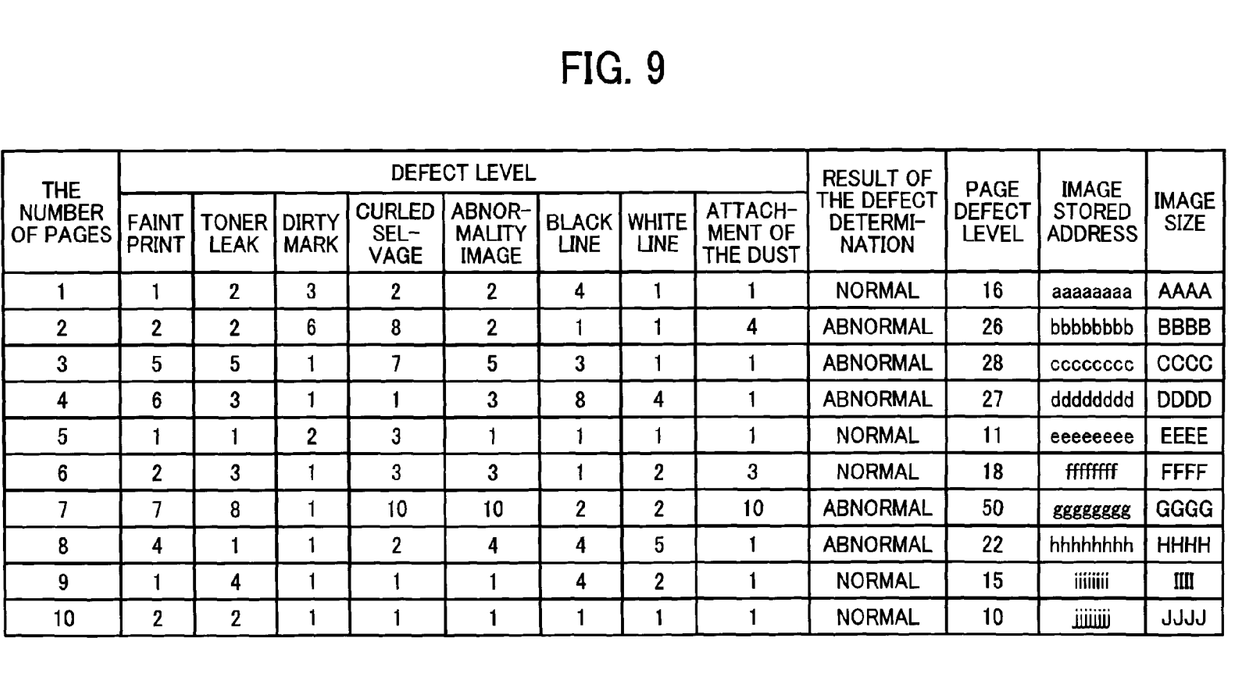
FIG. 9 shows a determiner result table according to an exemplary embodiment.

FIG. 9 illustrates a determiner result table stored in the determiner result table database 437. The determiner result table, for example, indicates the determination result determined by the type classification determiner unit 435. Referring to FIG. 9, the determiner result table includes information associating the defect level for each type of defect for each page with the determination result, the address stored for the image of the page, and the size of the page.

For example, as shown in FIG. 9, in the first page, the defect level for a faint print, a curled side, a toner leak, a dirty mark, an image abnormality, a black line, a white line, and, an attachment of the dust is "1", "2", "3", "2", "2", "4", "1", "1", respectively. Because, in the first page, each of the defect levels is lower than the permissible defect level for the respective types shown in FIG. 8, the result of the defect determination is indicated in the table as normal.

On the other hand, in the second page, the defect level for the faint print, the curled side, the toner leak, the dirty mark, the image abnormality, the black line, the white line, and, the attachment of the dust is "2", "2", "6", "8", "2", "1", "4", "1", respectively. Because, in the second page, the defect level for the dirty mark and the curled side are higher than the permissible defect level for the respective type shown in FIG. 8, the result of the defect determination is indicated in the table as abnormal.

Figure 10A:
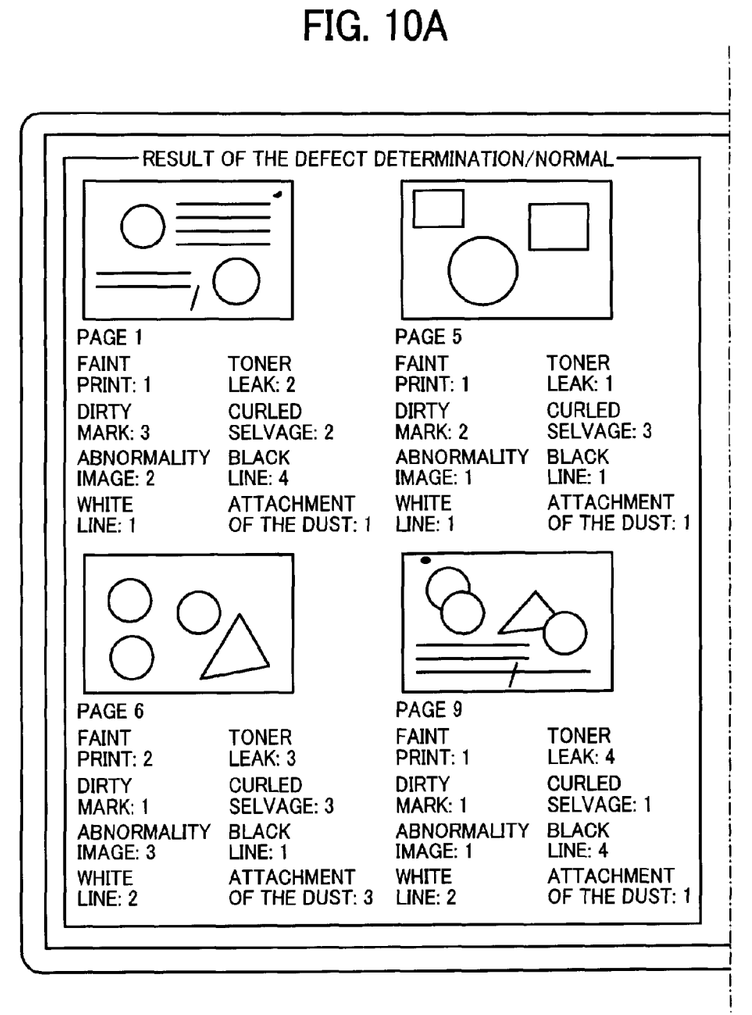
FIGS. 10A-B show a screen that displays information based on the determiner result table of FIG. 9 according to an exemplary embodiment.
Figure 10B:
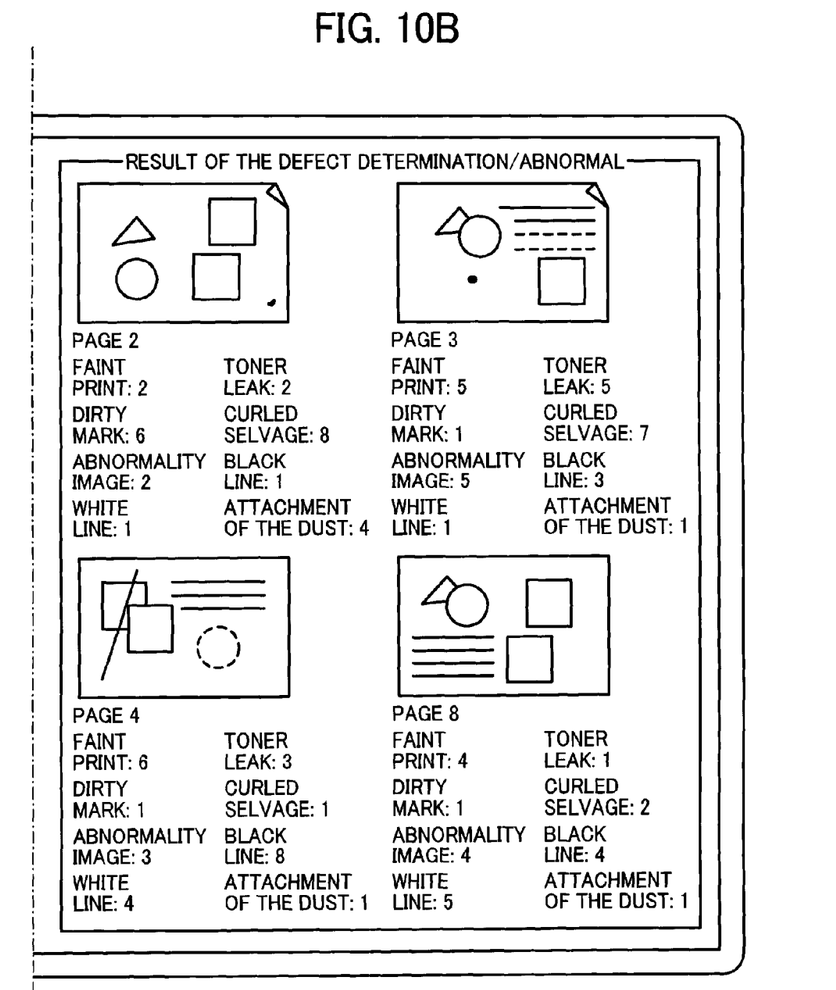

FIGS. 10A and B illustrate a screen generated by the display unit 438 on a LCD, for example, based on the determiner result table. As shown in FIGS. 10A and B, the display unit 438 displays on the LCD, a predetermined number of page information, each showing whether the determination result is normal or abnormal based on the determination result for each page stored the determiner result table 437. The display unit 438, for example, has the LCD display four pages in decreasing order of highest page defect level in order from among the five pages indicated as abnormal in this example, and another four pages in decreasing order of lowest page defect level in order from among the five pages indicated as abnormal in this example.

The page defect level is the total respective defect level value resulting from combining the defect values for each type of defect for each page. For example, as shown in FIG. 9, the page defect level of the first page, which is designated as normal, is the total value of the defect levels for each type of defect found in first page, e.g. 1+2+3+2+2+4+1+1=16. En the similar way, the page defect level of the fifth page, sixth page, ninth page and eleventh page is "11", "18", "15" and "19", respectively.

Therefore, as shown in FIG. 10A, the display unit 438 has the LCD display that displays the images of the first page, fifth page, sixth page and ninth page in which are the highest page defect level from among the normal pages along with the defect levels calculated each type of defect. In other words, these four pages are most abnormal pages from the five pages indicated as normal in this example. The page defect level for each of the above four pages is higher than the most normal page (page 10). The page defect level each of the above four pages is more abnormal than the most normal page (page 10 in this example).

From among the abnormal pages, the page defect level of each of the second page, third page, forth page, seventh page and eighth page is "26", "28", "27", "52", and "22", respectively. Therefore, as shown in FIG. 10B, the display unit 438 has the LCD display the images of second page, third page, forth page, and seventh page, in the decreasing order of lowest page defect level from among the abnormal pages along with the defect levels calculated for each type of defect. In other words, these four pages are the most normal pages from the five pages designated as abnormal. The page defect level each of the above four pages is lower than the most abnormal page (page 7). The page defect level each of the above four pages is closer to normal than the most abnormal page (page 7 in this example).

Further, a calculation of the page defect level may add a weight to the defect level of certain types of defect. In other words, certain types of defect may have a stronger influence on the calculated page defect level.

The permissible changing unit 439 changes the defect level in the permissible level table stored in the permissible level table database 436 based on an operation performed by the user via the operation device 70 together with the display screen that was displayed by the display unit 438. In other words, the permissible changing unit 439 is used as an inspection reference image generator that generates the master image, the permissible changing unit 439 operating as the permissible defect standard changing unit. Next, referring now to FIG. 11, a permissible defect changing processing by the permissible changing unit 439 is explained.

Figure 11:
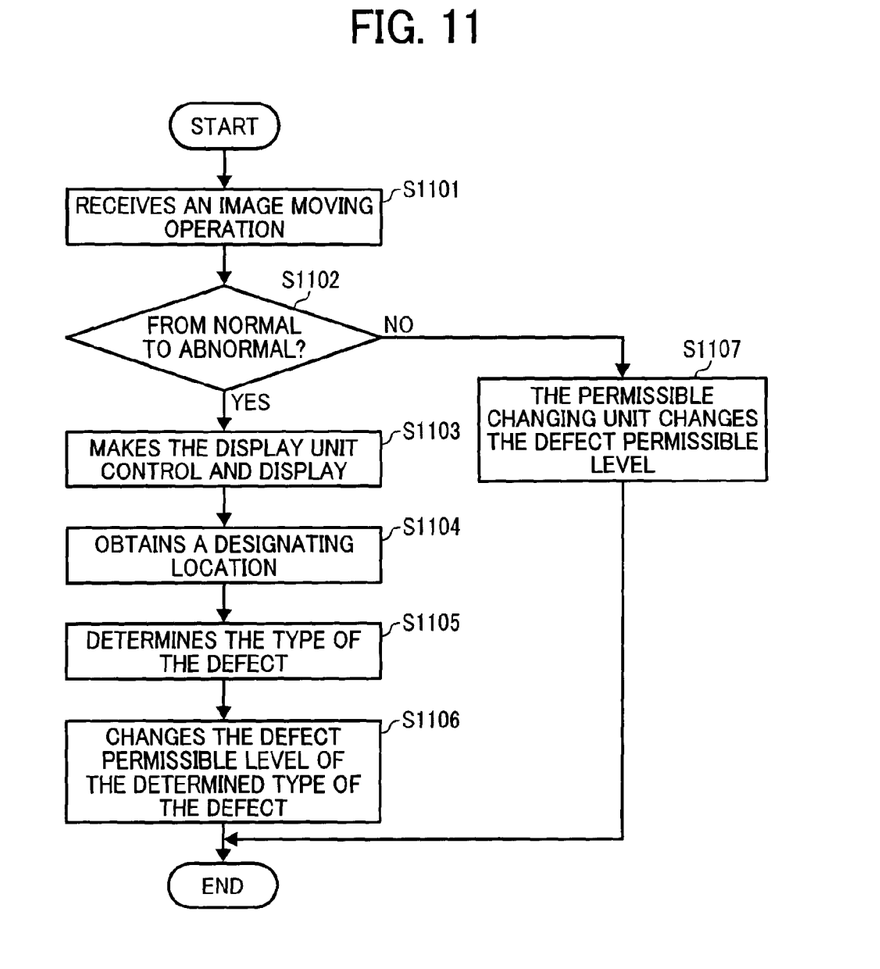
FIG. 11 shows a flowchart illustrating operation of defect permissible changing according to an exemplary embodiment.

FIG. 11 is a flowchart illustrating a permissible defect changing processing by the permissible changing unit 439. When an operation is performed by the user via the operation device 70 that moves an image, determined to be normal (hereinafter, referred to as a normal image), displayed the display screen as shown in FIG. 10 to the area for images determined to be abnormal (hereinafter, referred to as an abnormal image), or that moves the abnormal image to the area for normal images, the permissible changing unit 439 receives an image moving operation (S1101) as shown in FIG. 11.

Figure 12:
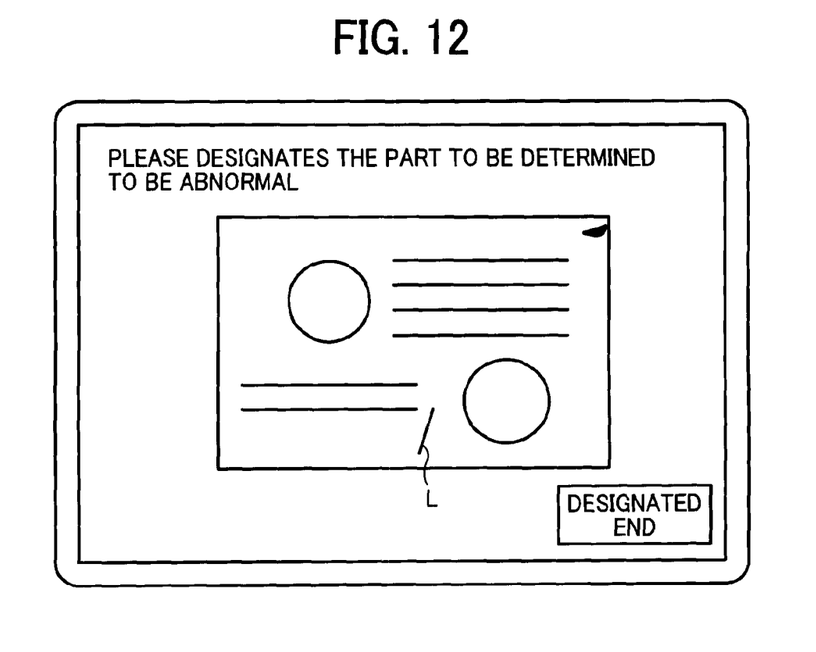
FIG. 12 shows a the defect location instruction screen according to an exemplary embodiment.

When the image moving operation received by the permissible changing unit 439 is operation which moves the images to the area where the abnormal images are displayed ("YES" at S1102), the permissible changing unit 439 instructs the display unit 438 to display a defect location instruction screen to the user which enables identification of the location of the defect in the image moved by the user (S1103). FIG. 12 illustrates the defect location instruction screen, which the display unit 438 displays. For example, when the image moving operation moves a normal image, such as an image on the first page displayed on the display screen as shown in FIG. 10, to the area for the abnormal images, as shown in FIG. 12, a magnified image of the page corresponding to the moved image is displayed.

FIG. 12 shows, for example, a message for prompting the user to designate the part of the image which is abnormal and a designation termination button that notifies the end of designating. The message and the button are displayed together with the magnified image. The user is able to designate the part of the image, which is abnormal in the magnified image shown in FIG. 12 by way of a touch panel or a mouse. Once the designation is accomplished, the user is able to select the termination button. In other words, the user designates the part in which the user wishes to have changed when moving the image from the designation as a normal image to the designation as an abnormal image. For instance, in the example shown in FIG. 12, the user designates the part of the black line L.

When the user pushes the designation termination button, the permissible changing unit 439 obtains a designated location identified by the user (S1104). The permissible changing unit 439 obtaining the designated location determines the type of defect existing at the designated location (S1105). For example, the permissible changing unit 439 determines the type of defect existing at the designated location based on the type of defect determined by the defect type determiner unit 434. In the example of FIG. 12, the permissible changing unit 439 determines the black line L as the black line type of defect.

The permissible changing unit 439 then changes the permissible defect level for the determined type of the defect to the previously detected defect level for the determined type of the defect with respect to the moved (S1106). For example, when the image of the first page is moved and the part of the black line is designated as the abnormal part, the permissible defect level of the black line in the permissible level table, as shown in FIG. 8, is changed from "5" to "4". The permissible defect level for the black line is changed to the defect level of the determined type of defect by the permissible changing unit 439. This means that, before any change is implemented when the defect level of the black line is "4" and the permissible defect level is "5" in the image of the first page, the image of the first page is not designated as abnormal because the defect level for the particular type of defect is lower than the permissible defect level for this type of defect. However, after the permissible defect level is changed from "5" to "4", the image of the first page would be determined as being abnormal.

On the other hand, when the image moving operation received by the permissible changing unit 439 is an operation moving the image to the area for normal images ("NO" at S1102), the permissible changing unit 439 determines whether the permissible defect level is lower than the defect level for each type of defect. When the permissible defect level is lower than the defect level for each type of defect for the moved image, the permissible changing unit 439 changes the permissible defect level (S1107).

For example, when the second image is moved to the area for normal images, the permissible changing unit 439 changes the defect permissible level for the dirty mark in the permissible level table, as shown in FIG. 8, from "4" to "5" and changes the permissible defect level of the curled side in the permissible level table, as shown in FIG. 8, from "5" to "6" (when these defects are designated). This means that when the defect level for the dirty mark and the curled side are higher than the permissible defect level for the dirty mark and the curled side, respectively, in the image of the second page, the image of the second page is determined to be abnormal. However, when the permissible defect level for the dirty mark and the curled side is changed from "4" to "5" and "5" to "6", respectively, (that is, the dirty mark and the curled side are more accepted), the image of the second page is determined to be normal.

In an exemplary embodiment, the user is able to confirm the defect determination of the image and is able to change a designation of an image from a normal image to an abnormal image or from an abnormal image to a normal image. Thus, merely by user operation, the permissible defect level for each type of defect may be changed. As a result, the user is able to intuitively set the permissible defect level for each type of defect.

The permissible changing unit 439 is able to change the defect level of a type of defect in the image to the value, which is the not indicated as a defect or is indicated as a defect for the type of the defect in which the defect level is the highest for the image. For example, when the image is operated by the user to move the image previously determined to be normal or previously determined to be abnormal, displayed the display screen as shown in FIG. 10A or 10B to the area for images determined to be abnormal or to be normal, the value of the defect is changed accordingly.

The permissible changing unit 439 may instruct the display unit to display a defect position permissible designation screen, which is a screen that permits a user to designate the position of the defect as shown FIG. 12. Further, the permissible changing unit 439 may change the permissible defect level corresponding to the type of defect at the position designated by the user.

Further, the permissible changing unit 439 may instruct the display unit to display the defect, which has a defect level that is higher than the permissible defect level in the magnified image displayed in the defect position designation screen.

Further, when the page, which was determined to be normal, is reprinted, the page is, as a result, determined to be abnormal. In this case, the same processing as that was used to move the normal image to the abnormal image area may be executed for the reprinted page.

In addition, for example, the image of a defect level, a job, a size of the sheet, a type of the sheet, a monochrome print, and a color print, may be displayed in the screen as shown in FIGS. 10A and B.

The invention claimed is:

1. An image inspection apparatus for inspecting an image output on a recording medium by scanning the recording medium as a scanned image, the image inspection apparatus comprising:
   an inspection reference image generator implemented by processing circuitry and configured to obtain an output-target image print data, and to generate an inspection reference image using the output-target image print data, the inspection reference image providing a reference in inspection of a read image;
   an inspection result acquisition unit implemented by the processing circuitry and configured to acquire a result of a defect determination based on a difference between the generated inspection reference image and the read image;
   a defect type determiner unit implemented by the processing circuitry and configured to determine a type of any defect included in the read image when the defect determination determines that at least one defect is present in the read image;
   a defect level calculating unit implemented by the processing circuitry and configured to calculate a defect level indicating a degree of the defect for each type of defect for a predetermined number of types of defect;
   a type classification determiner unit implemented by the processing circuitry and configured to determine, for each type of defect, whether each defect included in the read image is permissible based on a permissible defect level for each type of defect;
   a display control unit implemented by the processing circuitry and configured to control display of the read image, which includes permissible defect levels for each type of defect, in a normal image display area and to control display of the read image, which includes impermissible defect levels for any type of defect, in an abnormal image display area; and
   a permissible changing unit implemented by the processing circuitry and configured to receive a moving operation instruction which moves the displayed image between the normal image display area and the abnormal image display area and configured to, in response to receiving the moving operation instruction, change the permissible defect level for at least one type of defect.

2. The image inspection apparatus of claim 1, wherein the display control unit is further configured to display a predetermined number of normal read images in the normal image display area in decreasing order of highest total defect level for each respective normal read image, each respective total defect level calculated based on a sum of a defect level for each type of the defect included in the respective normal read image, wherein the normal read images are images which have a permissible defect level for each type of defect; and
   display a predetermined number of abnormal read images in the abnormal image display area in increasing order of lowest total defect level for each respective abnormal read image, each respective total defect level calculated based on a sum of a defect level for each type of the defect included in the respective abnormal read image, wherein the abnormal read images are images which have an impermissible defect for at least one type of defect.

3. The image inspection apparatus of claim 1, wherein the permissible changing unit is further configured to change the permissible defect level for the type of the defect designated in the read image when the read image having the designated defect is moved from the normal image display area to the abnormal image display area, such that the designated defect is no longer permitted.

4. The image inspection apparatus of claim 3, wherein the permissible changing unit is further configured to change, when the read image is reprinted, the permissible defect level for the type of defect which was designated in the reprinted read image.

5. The image inspection apparatus of claim 1, wherein the permissible changing unit is further configured to change the permissible defect level for the type of defect designated in the read image when the defect is moved from the abnormal image display area to the normal image display area, such that the designated defect is permitted.

6. An image inspection system for inspecting an image output on a recording medium by scanning the recording medium as a scanned image, the image inspection apparatus comprising:

an inspection reference image generator implemented by processing circuitry and configured to obtain an output-target image print data, and to generate an inspection reference image using the output-target image print data, the inspection reference image providing a reference in inspection of a read image;

an inspection result acquisition unit implemented by the processing circuitry and configured to acquire a result of a defect determination based on a difference between the generated inspection reference image and the read image;

a defect type determiner unit implemented by the processing circuitry and configured to determine a type of any defect included in the read image when the defect determination determines that at least one defect is present in the read image;

a defect level calculating unit implemented by the processing circuitry and configured to calculate a defect level indicating a degree of the defect for each type of defect for a predetermined number of types of defect;

a type classification determiner unit implemented by the processing circuitry and configured to determine, for each type of defect, whether each defect included in the read image is permissible based on a permissible defect level for each type of defect; a display controller implemented by the processing circuitry and configured to control display of a normal read image, which includes only permissible defects for each type of defect, in the normal image display area, and to control display of an abnormal read image, which includes at least one impermissible defect for each type of defect, in the abnormal image area; and a defect level permissible changing unit implemented by the processing circuitry and configured to receive a moving operation instruction which moves the displayed image between the normal image display area and the abnormal image display area and configured to, in response to receiving the moving operation instruction, change the permissible defect level of at least one type of defect.

7. A method of inspecting an image output on a recording medium by an image forming apparatus, the method comprising:

obtaining an output-target image print data, and generating an inspection reference image using the output-target image print data, the inspection reference image providing a reference in inspection of a read image;

acquiring a result of a defect determination based on a difference between the generated inspection reference image and the read image;

determining a type of any defect included in the read image when the defect determination determines that at least one defect is present in the read image;

calculating a defect level indicating a degree of the defect for each type of defect for a predetermined number of types of defect;

a type classification determiner unit configured to determine, for each type of defect, whether each defect included in the read image is permissible based on a permissible defect level for each type of defect;

displaying a normal read image, which includes only permissible defects for each type of defect, in the normal image display area, and, displaying an abnormal read image, which includes at least one impermissible defect for each type of defect, in the abnormal image area; and receiving a moving operation instruction which moves the displayed image between the normal image display area and the abnormal image display area and, in response to receiving the moving operation, changing the permissible defect level of at least one of defect.

\* \* \* \* \*